US012035117B2

(12) United States Patent
Combs et al.

(10) Patent No.: US 12,035,117 B2
(45) Date of Patent: Jul. 9, 2024

(54) LOUDSPEAKER SYSTEM FOR ARBITRARY SOUND DIRECTION RENDERING

(71) Applicant: HARMAN INTERNATIONAL INDUSTRIES, INCORPORATED, Stamford, CT (US)

(72) Inventors: John Combs, Castaic, CA (US); Christian Manuel Garcia, Winnetka, CA (US); Daniel Timothy Pye, Los Angeles, CA (US); Jason Riggs, Northridge, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 66 days.

(21) Appl. No.: 17/548,396

(22) Filed: Dec. 10, 2021

(65) Prior Publication Data

US 2023/0188893 A1 Jun. 15, 2023

(51) Int. Cl.
*H04R 3/12* (2006.01)
*H04R 5/02* (2006.01)

(52) U.S. Cl.
CPC ................. *H04R 3/12* (2013.01); *H04R 5/02* (2013.01); *H04R 2203/12* (2013.01); *H04R 2205/024* (2013.01)

(58) Field of Classification Search
CPC ........ H04R 3/12; H04R 5/02; H04R 2203/12; H04R 2205/024
See application file for complete search history.

(56) References Cited

U.S. PATENT DOCUMENTS 9,485,556 B1 11/2016 List
2017/0195795 A1* 7/2017 Mei ......................... H04S 7/304
2018/0197551 A1* 7/2018 McDowell ................ H04S 7/30
2020/0037097 A1* 1/2020 Torres ..................... H04S 7/303
2020/0367009 A1 11/2020 Family et al.

FOREIGN PATENT DOCUMENTS

EP 1 647 909 A2 4/2006

OTHER PUBLICATIONS

Dolby Atmos for the Home Theater, https://web.archive.org/web/20200521122348/https://www.dolby.com/us/en/technologies/dolby-atmos/dolby-atmos-for-the-home-theater.pdf, Oct. 2016, 15 pages.
Yamaha, Digital Sound Projector, Quick Reference Guide, https://usa.yamaha.com/files/download/other_assets/0/605030/web_ZS46190_YSP-5600_qrg_UCALV.pdf, 54 pages.

* cited by examiner

*Primary Examiner* — Andrew L Sniezek
(74) *Attorney, Agent, or Firm* — Artegis Law Group, LLP

(57) ABSTRACT

One embodiment of the present invention sets forth a technique for generating audio for a speaker system. The technique includes receiving an audio input signal, a first location associated with the audio input signal, a first geometric model of the speaker system, and a second geometric model of one or more surfaces in proximity to the speaker system. The technique also includes generating a plurality of output signals for a plurality of speaker drivers in the speaker system based on the audio input signal, the first location, and the first and second geometric models. The technique further includes transmitting the plurality of output signals to the plurality of speaker drivers, wherein the plurality of speaker drivers emit audio that corresponds to the plurality of output signals, the emitted audio rendering a sound corresponding to the audio input signal at the first location.

19 Claims, 7 Drawing Sheets

LOUDSPEAKER SYSTEM FOR ARBITRARY SOUND DIRECTION RENDERING

BACKGROUND

Field of the Various Embodiments

Embodiments of the present disclosure relate generally to audio processing systems and, more specifically, to a loudspeaker system for arbitrary sound direction rendering.

Description of the Related Art

Entertainment systems, such as audio/video systems implemented in movie theaters, advanced home theaters, music venues, and/or the like, continue to provide increasingly immersive experiences that include high-resolution video and multi-channel audio soundtracks. For example, commercial movie theater systems commonly enable multiple, distinct audio channels that are transmitted to separate speakers placed in front of, behind, and to the sides of the listeners. Such audio/video systems can also include audio channels that are transmitted to separate speakers placed above the listeners. As a result, listeners experience a three-dimensional (3D) sound field that surrounds the listeners on all sides and from above.

Listeners may also want to experience immersive 3D sound fields when listening to audio via non-commercial audio systems. Some advanced home audio equipment, such as headphones and headsets, implement head-related transfer functions (HRTFs) that can reproduce sounds that are interpreted by a listener as originating from specific locations around the listener. HRTF and other similar technologies therefore provide an immersive listening experience when listening to audio on supported systems.

One drawback of existing audio systems is that these systems are limited in their ability to render audio that appears to originate in certain locations or directions without adding individual speakers at those locations or along those directions. For example, a surround-sound system could support two-dimensional (2D) sound that is generated by speakers pointed at a listener from the front, back, and sides. The surround-sound system could also generate sound that appears to originate from above the listener via additional speakers that are installed above the listener or that are pointed upward and generate sound that is reflected off a ceiling before reaching the listener. In another example, sounds emitted by the speakers of an audio system can be blocked by people or objects or interfere with one another. When this blocking or interference occurs and/or when the listener moves or turns his/her head, the sound can be distorted or otherwise reduced in quality. This distortion or reduction in quality can additionally cause the listener to fail to perceive the sound as originating from the desired locations, thereby resulting in in a loss of spatial resolution in the listener's perception of the sound.

As the foregoing illustrates, what is needed in the art are more effective techniques for increasing the spatial resolution of audio systems.

SUMMARY

Various embodiments of the present invention set forth a computer-implemented method for generating audio for a speaker system. The method includes receiving an audio input signal, a first location associated with the audio input signal, a first geometric model of the speaker system, and a second geometric model of one or more surfaces in proximity to the speaker system. The technique also includes generating a plurality of output signals for a plurality of speaker drivers in the speaker system based on the audio input signal, the first location, the first geometric model, and the second geometric model. The technique further includes transmitting the plurality of output signals to the plurality of speaker drivers, wherein the plurality of speaker drivers emit audio that corresponds to the plurality of output signals, the audio rendering a sound corresponding to the audio input signal at the first location.

Other embodiments include, without limitation, one or more computer-readable media including instructions for performing one or more aspects of the disclosed techniques and a system the implements one or more aspects of the disclosed techniques.

At least one technical advantage of the disclosed techniques relative to the prior art is that, with the disclosed techniques, sound can be generated that appears to originate from arbitrary locations within a full 3D sound field using fewer speaker units. Accordingly, the disclosed techniques increase the spatial coverage and resolution of sound transmitted within the sound field without requiring the placement of additional speaker units at locations from which the sound appears to originate. Another technical advantage of the disclosed techniques is the ability to generate sound in a way that accounts for the environment around the speaker units and the position and orientation of a listener within the environment. The disclosed techniques thus reduce distortion, loss of audio quality, and/or loss of spatial resolution associated with the blocking of sound by objects, interference between sounds produced by different speakers, and/or changes in the listener's position or orientation. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1A:
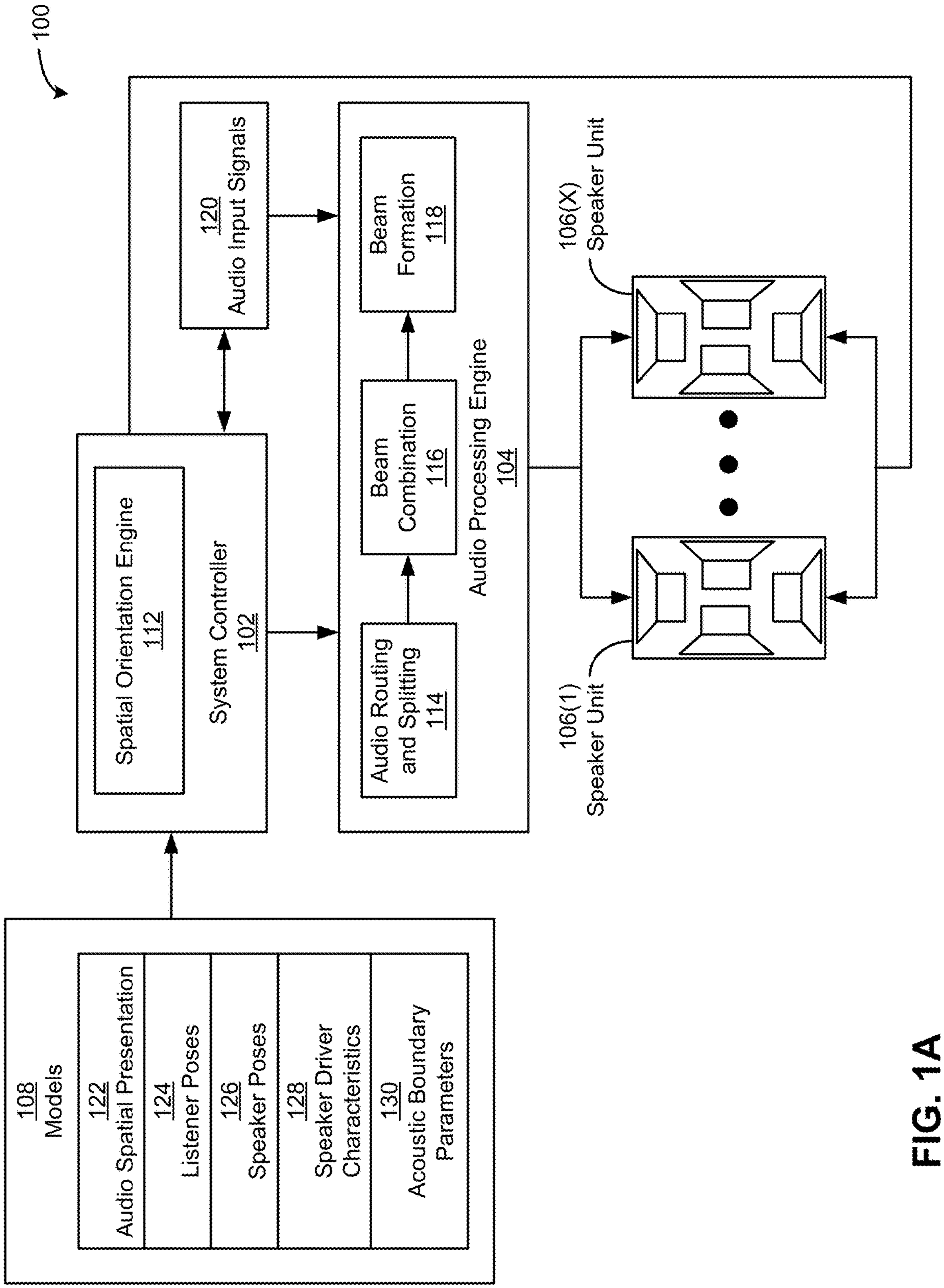
FIG. 1A illustrates a speaker system configured to implement one or more aspects of various embodiments.

FIG. 1A illustrates a speaker system 100 configured to implement one or more aspects of various embodiments. As shown in FIG. 1A, speaker system 100 includes, without limitation, a system controller 102 and an audio processing engine 104 that are coupled to one another and a number of speaker units 106(1)-106(X). Each of speaker units 106(1)-106(X) is referred to individually as speaker unit 106.

Figure 1B:
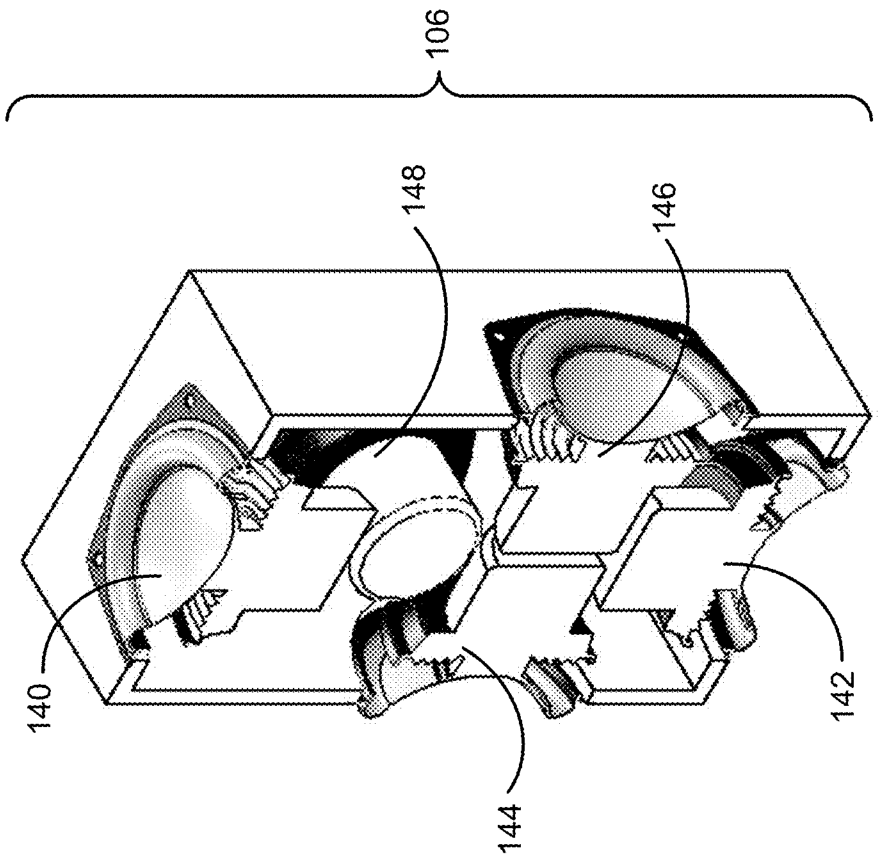
FIG. 1B illustrates a cutaway view of an example speaker unit of FIG. 1A, according to various embodiments.

In one or more embodiments, each speaker unit 106 includes multiple speaker drivers (e.g., transducers) that are pointed in different directions to generate a 3D sound field. More specifically, FIG. 1B illustrates a cutaway view of an example speaker unit 106 of FIG. 1A, according to various embodiments. As shown in FIG. 1B, the example speaker unit 106 includes five speaker drivers 140-148 on different faces of a cuboid speaker enclosure. The example speaker unit optionally includes a sixth speaker driver (not shown) on a face (not shown) of the speaker enclosure that is opposite the face that includes speaker driver 148. Thus, speaker drivers 140-148 (along with the optional sixth speaker driver) point in directions that are orthogonal to one another (e.g., upward, downward, to the left, to the right, forwards, and/or backwards).

Sound emitted by a given speaker driver can reach a listener in the vicinity of the speaker enclosure via a direct path when the speaker driver is pointed substantially in the direction of the listener and the path between the speaker driver and the listener is not occluded. For example, sound emitted by speaker driver 146 could directly reach the listener when speaker driver 146 is pointed generally in the direction of the listener and no objects lie along a line between speaker driver 146 and the listener.

Sound emitted by a speaker driver could alternatively or additionally reach the listener via indirect path that involves reflecting the sound off a surface before reaching the listener. Continuing with the above example, sound emitted by speaker driver 148 could reach the listener via a first indirect path after the sound reflects off a wall, window, or another surface that is generally in front of speaker driver 148. Sound emitted by speaker driver 140 could reach the listener via a second indirect path after the sound reflects off a ceiling or another surface that is above the speaker enclosure. Sound emitted by speaker driver 142 could reach the listener via a third indirect path after the sound reflects off a floor or another surface that is below the speaker enclosure. Sound emitted by speaker driver 144 could reach the listener via a fourth indirect path after the sound reflects off a wall, a corner, or another surface that is generally in front of speaker driver 144. As described in further detail below, sounds emitted by the one or more speaker drivers 140-148 could be used to generate beams along directions that are not in line with the directions in which speaker drivers 140-148 point.

While the example speaker unit 106 of FIG. 1B is illustrated with speaker drivers 140-148 that point in orthogonal directions, those skilled in the art will appreciate that speaker unit 106 can include other configurations or arrangements of speakers. For example, speaker unit 106 could include two or more speaker drivers that point in the same direction and/or are on the same face of a speaker enclosure. In another example, speaker unit 106 could include speaker drivers on some or all faces of a speaker enclosure with a tetrahedral, pyramidal, octahedral, dodecahedral, icosahedral, spherical, toroidal, and/or another type of polyhedral or 3D shape. In a third example, speaker unit 106 could include different types of speaker drivers (e.g., tweeters, midrange drivers, woofers, etc.) in various numbers and/or configurations.

Returning to the discussion of FIG. 1A, system controller 102 and audio processing engine 104 are configured to control the generation of audio output on speaker units 106 so that sounds rendered by speaker units 106 are perceived by a listener to originate from arbitrary locations or directions. Input into system controller 102 includes a number of models 108 that affect the rendering of sound by speaker units 106.

Models 108 include, without limitation, an audio spatial presentation 122, one or more listener poses 124, one or more speaker poses 126, one or more speaker driver characteristics 128, and/or one or more acoustic boundary parameters 130. Audio spatial presentation 122 includes information related to the perceived locations or directions from which various sounds associated with one or more audio input signals 120 are to originate. For example, audio spatial presentation 122 could include two-dimensional (2D), 3D, spherical, and/or other coordinates representing the location and/or direction from which the sound is to originate.

Listener poses 124 include positions and orientations of one or more listeners in the vicinity of the speaker system. For example, listener poses 124 could include coordinates representing the position of each listener and one or more vectors that represent the orientation of the listener and/or the ears of the listener. In addition, listener poses 124 may be updated to reflect changes to the position and/or orientation of the listener. For example, a camera, depth sensor, accelerometer, gyroscope, and/or another type of sensor or tracking system (not shown) could be used to track and update listener poses 124 for one or more listeners in the vicinity of the speaker system on a real-time or near-real-time basis. Alternatively, listener poses 124 may be fixed and/or pre-specified (e.g., as "known" or "ideal" listener locations in a theater, listening room, and/or another type of listening environment).

Speaker poses 126 include positions and orientations of speaker drivers in speaker units 106. For example, speaker poses 126 could include coordinates representing the position of the center of each speaker unit, as well as one or more vectors that represent the orientation of the speaker unit. When the speaker system includes or supports speaker units 106 with different numbers and/or configurations of speaker drivers, speaker poses 126 may additionally specify the configuration of speaker drivers, the types of speaker drivers, the enclosure size, the enclosure shape, and/or other attributes that affect the positions and/or orientations of speaker drivers in each speaker unit 106. As with listener poses 124, speaker poses 126 may be provided and/or determined in a number of ways. For example, one or more sensors in and/or around speaker units 160 could be used to determine the positions and orientations of speaker units 160 in a room and/or another environment. In another example, a listener and/or another user could manually specify the positions and orientations of speaker units 160 and/or speaker drivers in each speaker unit 160 within a given environment.

Speaker driver characteristics 128 include attributes that affect the emission of sounds by speaker drivers in each speaker unit 106. For example, speaker driver characteristics 128 could include (but are not limited to) a frequency response, enclosure material, and/or speaker driver material associated with each speaker unit 106 and/or individual speaker drivers in each speaker unit 106.

Acoustic boundary parameters 130 include attributes related to surfaces in the vicinity of the speaker system. For example, acoustic boundary parameters 130 could include a 3D geometric model of a floor, ceiling, one or more walls, one or more windows, one or more doors, one or more corners, one or more objects, one or more listeners, and/or other physical entities that can affect the absorption, diffraction, refraction, and/or reflection of sound produced by speaker units 106. Acoustic boundary parameters 130 could also include parameters that characterize the absorption or reflection of sound by a given surface. As with listener poses 124 and speaker poses 126, acoustic boundary parameters 130 can be determined by a camera, one or more microphones, a depth sensor, and/or another type of sensor. For example, acoustic boundary parameters 130 could be measured by an array of microphones at a listening location based on sounds that are emitted by one or more speaker units 106 and/or another audio source. Acoustic boundary parameters 130 may also, or instead, be provided by a listener and/or another user in the vicinity of the speaker system. For example, the user could manually generate a layout of a room in which the speaker system is placed and/or perform one or more scans to determine the layout of the room. The user could also specify materials, reflective characteristics, and/or absorptive characteristics of each surface in the room.

In one or more embodiments, system controller 102 includes a spatial orientation engine 112 that performs spatial optimization related to sound emitted by speaker units 106 based on models 108. For example, spatial orientation engine 112 could determine a maximum sound that can be generated per zone (e.g., a region of 3D space around the speaker system), a maximum silence that can be generated per zone, a frequency response optimization that is applied to audio input signals 120 based on the frequency responses of speaker units 106 and/or individual speaker drivers in speaker units 106, and/or a differential left and right listener ear optimization for each listener.

Audio processing engine 104 performs processing related to audio input signals 120 based on the spatial optimization performed by spatial orientation engine 112. First, audio processing engine 104 performs audio routing and splitting 114 of audio input signals 120 across speaker units 106. For example, audio processing engine 104 could split audio input signals 120 into multiple audio channels and/or sounds associated with different locations in audio spatial presentation 122. Audio processing engine 104 could also determine individual speaker units 106 and/or speaker drivers to which each audio channel or sound is to be routed.

Next, audio processing engine 104 performs beam combination 116 that determines beam patterns that can be used to render sounds associated with the audio channels at the corresponding locations, relative to listener locations in listener poses 124. For example, audio processing engine 104 could determine a beam pattern of two or more beams to be generated by two or more speaker units 106 and/or speaker drivers that, when combined, generate a sound that is perceived by a listener at a given listener location to originate from a certain direction.

Audio processing engine 104 then performs beam formation 118 that determines how beams in each beam combination 116 are to be formed, given audio that can be emitted by individual speaker units 106 and/or speaker drivers. For example, audio processing engine 104 could determine delays, amplitudes, phases, and/or other time- or frequency-based attributes of a given audio to be emitted by individual speaker drivers in one or more speaker units 106. When the speaker drivers emit the audio, the transmitted sound constructively interferes to form one or more beams of sound in one or more directions. The transmitted sound also, or instead, destructively interferes to form one or more nulls that suppress the sound in one or more other directions. The operation of audio processing engine 104 is described in further detail below with respect to FIG. 3.

Figure 2:
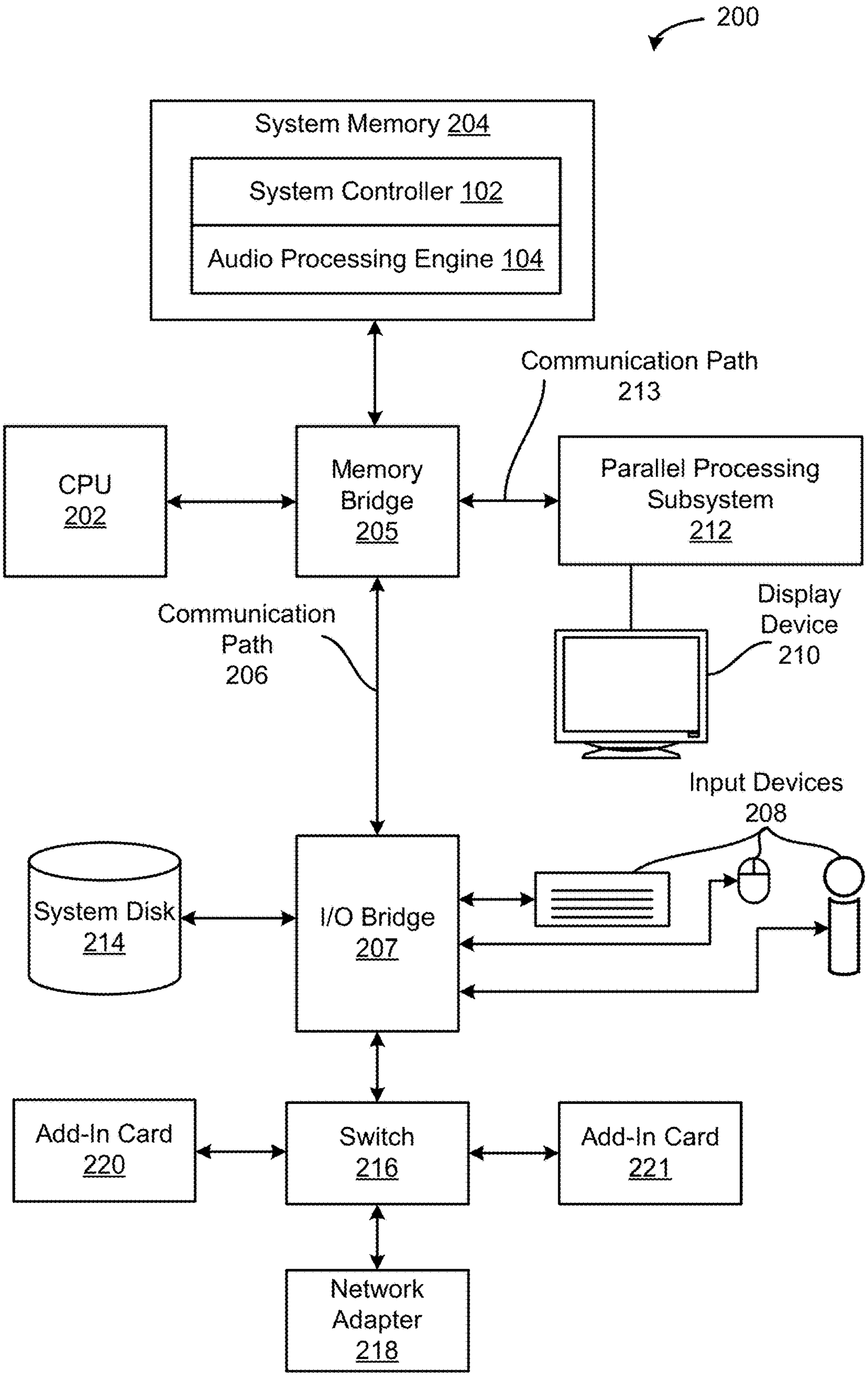
FIG. 2 is a block diagram of a computing device that can be implemented in conjunction with or coupled to the speaker system of FIG. 1A, according to various embodiments.

FIG. 2 is a block diagram of a computing device 200 that can be implemented in conjunction with or coupled to the speaker system of FIG. 1A, according to various embodiments. It is noted that computing device 200 described herein is illustrative and that any other technically feasible configurations fall within the scope of the present invention. For example, the hardware and/or software components of computing device 200 could be implemented on a single computing device and/or distributed across multiple computing devices. In another example, various hardware and/or software components of computing device 200 could be merged, rearranged, omitted, and/or replaced with other components with similar or different functionality.

As shown, computing device 200 includes, without limitation, a central processing unit (CPU) 202 and a system memory 204 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In operation, I/O bridge 207 is configured to receive user input information from input devices 208, such as a keyboard, a mouse, a touch screen, a microphone, and/or the like, and forward the input information to CPU 202 for processing via communication path 206 and memory bridge 205. Switch 216 is configured to provide connections between I/O bridge 207 and other components of computing device 200, such as a network adapter 218 and various optional add-in cards 220 and 221.

I/O bridge 207 is coupled to a system disk 214 that may be configured to store content, applications, and data for use by CPU 202 and parallel processing subsystem 212. As a general matter, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 207 as well.

In various embodiments, memory bridge 205 may be a Northbridge chip, and I/O bridge 207 may be a Southbridge chip. In addition, communication paths 206 and 213, as well as other communication paths within computing device 200, may be implemented using any technically suitable protocols, including, without limitation, AGP (Accelerated Graphics Port), HyperTransport, or any other bus or point-to-point communication protocol known in the art.

In some embodiments, parallel processing subsystem 212 includes a graphics subsystem that delivers pixels to a display device 210, which may be any conventional cathode ray tube, liquid crystal display, light-emitting diode display, or the like. For example, parallel processing subsystem 212 could include a graphics processing unit (GPU) and one or more associated device drivers. The GPU could be integrated into the chipset for CPU 202, or the GPU could reside on a discrete GPU chip.

It will be appreciated that the system shown herein is illustrative and that variations and modifications are possible. The connection topology, including the number and arrangement of bridges, the number of CPUs, and the number of parallel processing subsystems, may be modified as desired. For example, system memory 204 could be connected to CPU 202 directly rather than through memory bridge 205, and other devices would communicate with system memory 204 via memory bridge 205 and CPU 202. In another example, parallel processing subsystem 212 could be connected to I/O bridge 207 or directly to CPU 202, rather than to memory bridge 205. In a third example, I/O bridge 207 and memory bridge 205 could be integrated into a single chip instead of existing as one or more discrete devices. In a fourth example, the functionality of CPU 202 could be supplemented with or implemented by a digital signal processor (DSP). Lastly, in certain embodiments, one or more components shown in FIG. 2 may be omitted. For example, switch 216 could be eliminated, and network adapter 218 and add-in cards 220, 221 would connect directly to I/O bridge 207. In another example, display device 210 and/or input devices 208 could be omitted.

In some embodiments, computing device 200 is configured to execute or implement system controller 102 and/or audio processing engine 104 that reside in system memory 204. System controller 102 and/or audio processing engine 104 may be stored in system disk 214 and/or other storage and loaded into system memory 204 when executed.

More specifically, computing device 200 is configured to perform processing related to rendering of arbitrary sound directions on one or more speaker units 106. As described above, system controller 102 performs spatial optimization related to sound emitted by speaker units 106 based on models 108 that describe one or more perceived locations or directions of the sound, the positions and orientations of speaker units 106 and/or speaker drivers in speaker units 106, the positions and orientations of one or more listeners in the vicinity of speaker units 106, locations and/or attributes related to acoustic boundaries the vicinity of speaker units 106, and/or characteristics related to the generation of sound by speaker units 106 and/or speaker drivers in speaker units 106. For example, system controller 102 could execute on a receiver, amplifier, television, mobile device, console, and/or another computing device that communicates with audio processing engine 104 and/or speaker units 106 over a wired and/or wireless connection.

After the spatial optimization is complete, system controller 102 generates output that includes an audio component and/or a directional component. For example, the audio component could include audio channels, sounds, and/or other portions of audio input signals 120 that have been adjusted by system controller 102 based on frequency response optimization, differential listener ear optimization, and/or other optimizations. The directional component could include perceived directions of individual sounds, audio channels, beams, and/or other portions of audio input signals 120.

Audio processing engine 104 uses the spatial optimization output produced by system controller 102 to generate various outputs that are transmitted to individual speaker units 106 and/or speaker drivers in each speaker unit. The outputs are used by the corresponding speaker units 106 and/or speaker drivers to render sounds that are perceived by the listener(s) to originate from certain locations. For example, audio processing engine 104 could execute in the same computing device as system controller 102 to perform beamforming-related processing for multiple speaker units 106 based on spatial optimization output from system controller 102. Alternatively or additionally, a separate instance of audio processing engine 104 could reside on each speaker unit 106 and generate outputs for individual speaker drivers in the speaker unit based on spatial optimization output from system controller 102 that is specific to the speaker unit (e.g., specific sounds or audio channels to be outputted by speaker drivers in the speaker unit, directions of beams or nulls associated with the sounds or audio channels, etc.).

As described in further detail below, audio processing engine 104 generates audio outputs to individual speaker drivers in a given speaker unit 106 by separately processing high-frequency, low-frequency, and middle-frequency components of audio channels, sounds, and/or other portions of audio input signals 230 received from system controller 102. Audio processing engine 104 then transmits the audio outputs to the speaker drivers to cause the speaker drivers to transmit audio corresponding to the portions of audio input signals 230. This transmitted audio is then combined to render one or more sounds at one or more respective locations specified by system controller 102.

Rendering Arbitrary Sound Directions on a Loudspeaker System

Figure 3:
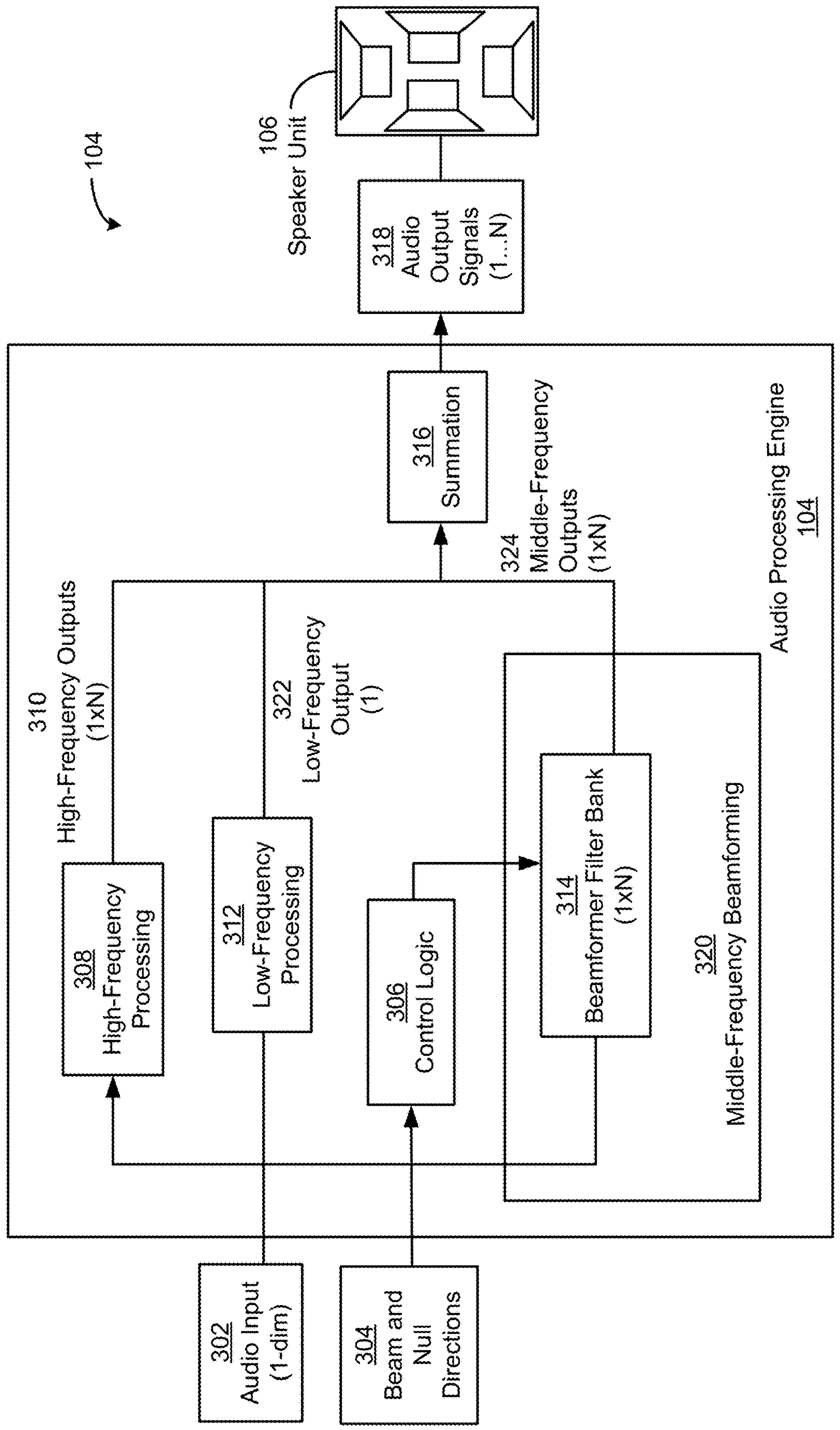
FIG. 3 is a more detailed illustration of the audio processing engine of FIG. 1A, according to various embodiments.

FIG. 3 is a more detailed illustration of audio processing engine 104 of FIG. 1A, according to various embodiments. As shown in FIG. 3, input into audio processing engine 104 includes a one-dimensional audio input 302, such as a single sound or audio channel to be played by N speaker drivers in a single speaker unit 106 (e.g., up to N=6 orthogonal speaker drivers in the example speaker unit 106 of FIG. 1B). Input into audio processing engine 104 also includes one or more beam and null directions 304 associated with audio input 302. For example, beam and null directions 304 could include coordinates, vectors, and/or other representations of locations or directions at which one or more beams of sound are to be directed. Beam and null directions 304 could also, or instead, include coordinates, vectors, and/or other representations of locations or directions at which one or more nulls (e.g., regions of silence or a substantial lack of sound) are to be rendered.

Audio processing engine 104 divides the one-dimensional audio input 302 into high-frequency components, low-frequency components, and middle-frequency components. For example, audio processing engine 104 could divide audio input 302 into high-frequency components with frequencies that are higher than a first threshold (e.g., 2-3 kHz), low-frequency components with frequencies that fall below a second threshold (e.g., 200-300 Hz), and middle-frequency components with frequencies that fall between the first and second thresholds.

Next, audio processing engine 104 separately performs high-frequency processing 308 using the high-frequency components, low-frequency processing 312 using the low-frequency components, and middle-frequency beamforming 320 using the middle-frequency components. More specifically, audio processing engine 104 performs low-frequency processing 312 that generates, from the low-frequency components, a single low-frequency output 322 for transmission to all speaker drivers in speaker unit 160. Low-frequency output 322 is used by the speaker drivers to generate the same low-frequency portion of a sound, thereby allowing the speaker drivers to operate as a subwoofer within speaker unit 160.

Audio processing engine 104 also performs high-frequency processing 308 that generates a 1×N matrix of high-frequency outputs 310 from high-frequency components of audio input 302. Each element in the matrix corresponds to a different speaker driver and includes high-frequency audio to be transmitted by the speaker driver. For example, high-frequency outputs 310 could be generated based on general correspondence between beam and null directions 304 and the directions in which individual speaker drivers in speaker unit 106 point. Thus, a high-frequency output that represents a louder and/or more noticeable sound could be transmitted to a speaker driver that generally faces the same direction as that of a beam, while a high-frequency output that represents a softer and/or less noticeable sound (or a lack of sound) could be transmitted to a speaker driver that faces away from the direction of a beam.

Audio processing engine 104 further performs middle-frequency beamforming 320 that generates a 1×N beamformer filter bank 314 for middle-frequency components of audio input 302. In particular, audio processing engine 104 includes control logic 306 that generates N bandpass filters in beamformer filter bank 314, where each bandpass filter corresponds to a different speaker driver in speaker unit 106. After filters in beamformer filter bank 314 are generated by control logic 306, audio processing engine 104 applies the filters to the middle-frequency components to produce a 1×N matrix of middle-frequency outputs 324. Each middle-frequency output represents middle-frequency audio to be transmitted by a corresponding speaker driver in speaker unit 106. The N middle-frequency outputs 324 produced by middle-frequency beamforming 320 can vary in phase, amplitude, delay, and/or other time- or frequency-based attributes. These variations in attributes cause the middle-frequency audio emitted by multiple speaker drivers in speaker unit 106 to interfere constructively or destructively, thereby forming middle-frequency beams and nulls at the corresponding beam and null directions 304.

After a single low-frequency output 322, N high-frequency outputs 310, and N middle-frequency outputs 324 are generated from a given audio input 302, audio processing engine 104 performs a summation 316 of these outputs to generate N audio output signals 318. For example, audio processing engine 104 could generate a different audio output signal for each speaker driver in speaker unit 106 by summing the single low-frequency output 322, a high-frequency output that is specific to the speaker driver, and a middle-frequency output that is specific to the speaker driver. Audio processing engine 104 then transmits audio output signals 318 to speaker unit 106 and/or speaker drivers in speaker unit 106 to cause the speaker drivers to emit sounds corresponding to audio output signals 318.

In one or more embodiments, one or more instances of audio processing engine 104 generate audio output signals 318 for multiple speaker units 106 and/or speaker drivers so that a listener perceives multiple beams formed by these speaker units and/or drivers as a single sound that originates from a given location or direction. As described in further detail below with respect to FIG. 4, these audio output signals 318 can be timed so that the beams arrive at the listener at substantially the same time, thereby avoiding lag discrimination that can be caused by the beams arriving at slightly different times.

Audio processing engine 104 optionally performs high-frequency processing 308, low-frequency processing 312, and middle-frequency beamforming 320 for additional one-dimensional audio inputs received from system controller 102. For example, audio processing engine 104 could generate high-frequency output 310, low-frequency output 322, and middle-frequency outputs 324 for each sound to be emitted by speaker unit 106. Audio processing engine 104 then performs summation 316 of high-frequency outputs 310, low-frequency output 322, and middle-frequency outputs 324 produced from all audio inputs for a given time step or interval (e.g., all audio inputs representing one or more sounds to be emitted at a given time) and transmits the corresponding audio output signals 318 to speaker unit 106 and/or individual speaker drivers in speaker unit 106. The speaker drivers then generate audio corresponding to the transmitted audio output signals 318, which is optionally combined with audio from speaker drivers in other speaker units 106 and/or other types of loudspeakers to produce one or more sounds within a 3D sound field.

Figure 4:
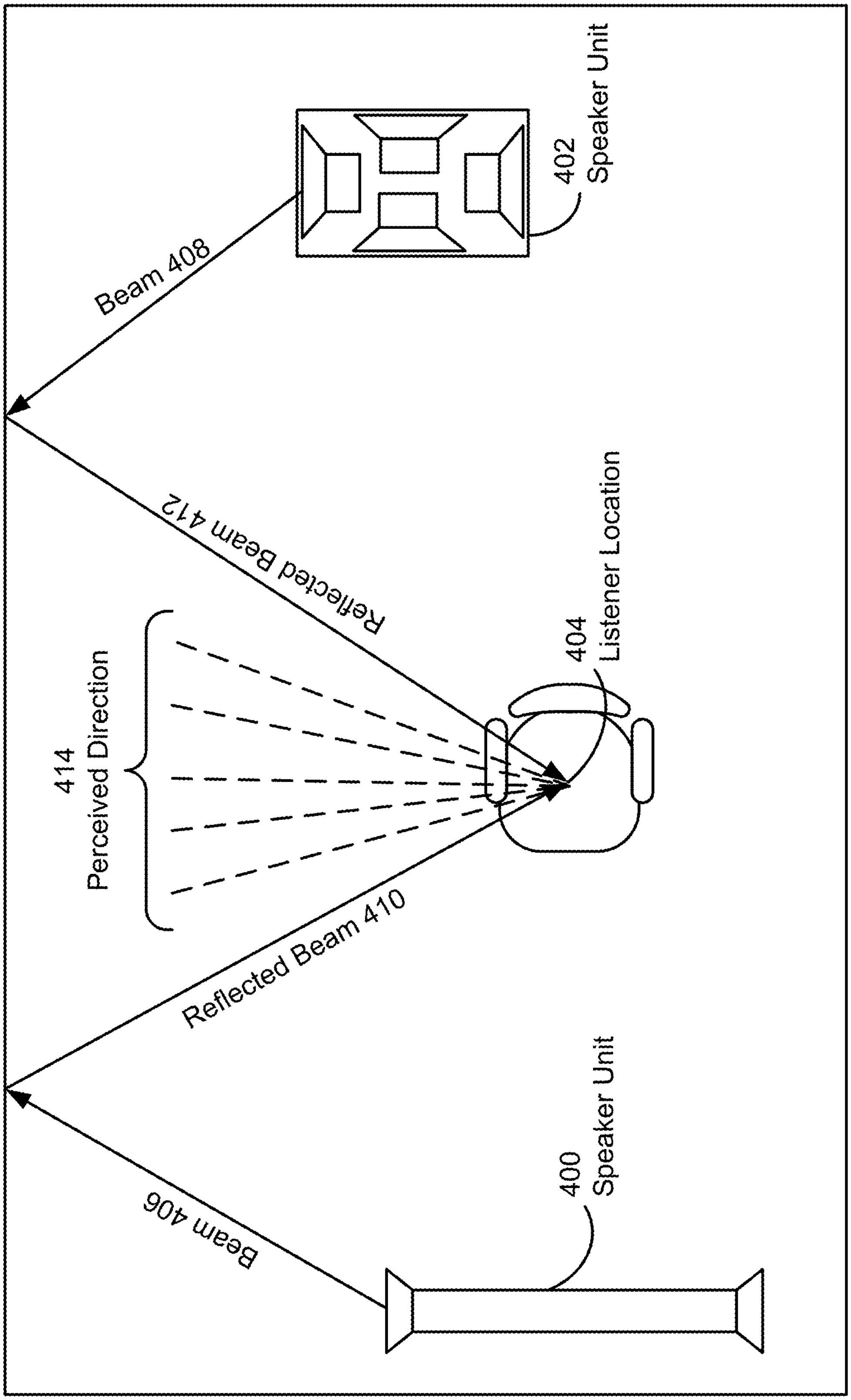
FIG. 4 illustrates an example creation of a virtual sound source within an environment, according to various embodiments.

FIG. 4 illustrates an example creation of a virtual sound source within an environment, according to various embodiments. As shown in FIG. 4, a listener at a listener location 404 perceives the virtual sound source to originate from a perceived direction 414, even though the region corresponding to perceived direction 414 lacks any speakers or speaker drivers. Instead, the virtual sound source is formed by a first beam 406 generated by one speaker unit 400 on one side of the listener and a second beam 406 generated by a second speaker unit 402 on a different side of the listener.

More specifically, beam 406 is directed toward an acoustically reflective surface (e.g., a wall, window, pillar, etc.) at a certain angle, which causes a reflected beam 410 originating from the point at which beam 406 meets the surface to be directed towards listener location 404. Similarly, beam 408 is directed toward the surface at a potentially different angle, which causes another reflected beam 412 originating from the point at which beam 408 meets the surface to be directed towards listener location 404. The arrival of both reflected beams 410-412 at listener location 404 causes the listener at listener location 404 to perceive a sound transmitted via beams 406-408 and reflected beams 410-412 to originate from perceived direction 414.

Further, beams 406 and 408 may be generated by speaker units 400 and 402, respectively, to avoid distortions in perceived direction 414 that can be caused by the precedence effect. For example, system controller 102 and/or one or more instances of audio processing engine 104 could use one or more models 108 to generate various control and/or audio output signals to speaker units 400 and 402. These control and/or audio output signals cause speaker units 400 and 402 to transmit audio that forms beams 406 and beams 408, respectively, at certain amplitudes, directions, and times, which cause reflected beams 410-412 to concurrently arrive at listener location 404. This concurrent arrival of reflected beams 410-412 at listener location 404 prevents the direction of a reflected beam that arrives earlier from dominating perceived direction 414.

In one or more embodiments, each of speaker units 400-402 includes one or more speaker drivers housed in a speaker enclosure. For example, speaker unit 400 could include a beamforming soundbar, and speaker unit 402 could include a speaker unit with speaker drivers that point in orthogonal directions (e.g., speaker unit 106 of FIG. 1B). In general, one or more virtual sound sources can be generated at a given listener location 404 based on an arrangement of one or more speaker units (e.g., speaker units 400-402) in proximity to listener location 404 and/or a layout of acoustically reflective surfaces around listener location 404. For example, three, four, or more speaker units could be used to generate sounds, beams, and/or virtual sound sources that are perceived by a listener at listener location 404 to arrive from different perceived directions.

Figure 5:
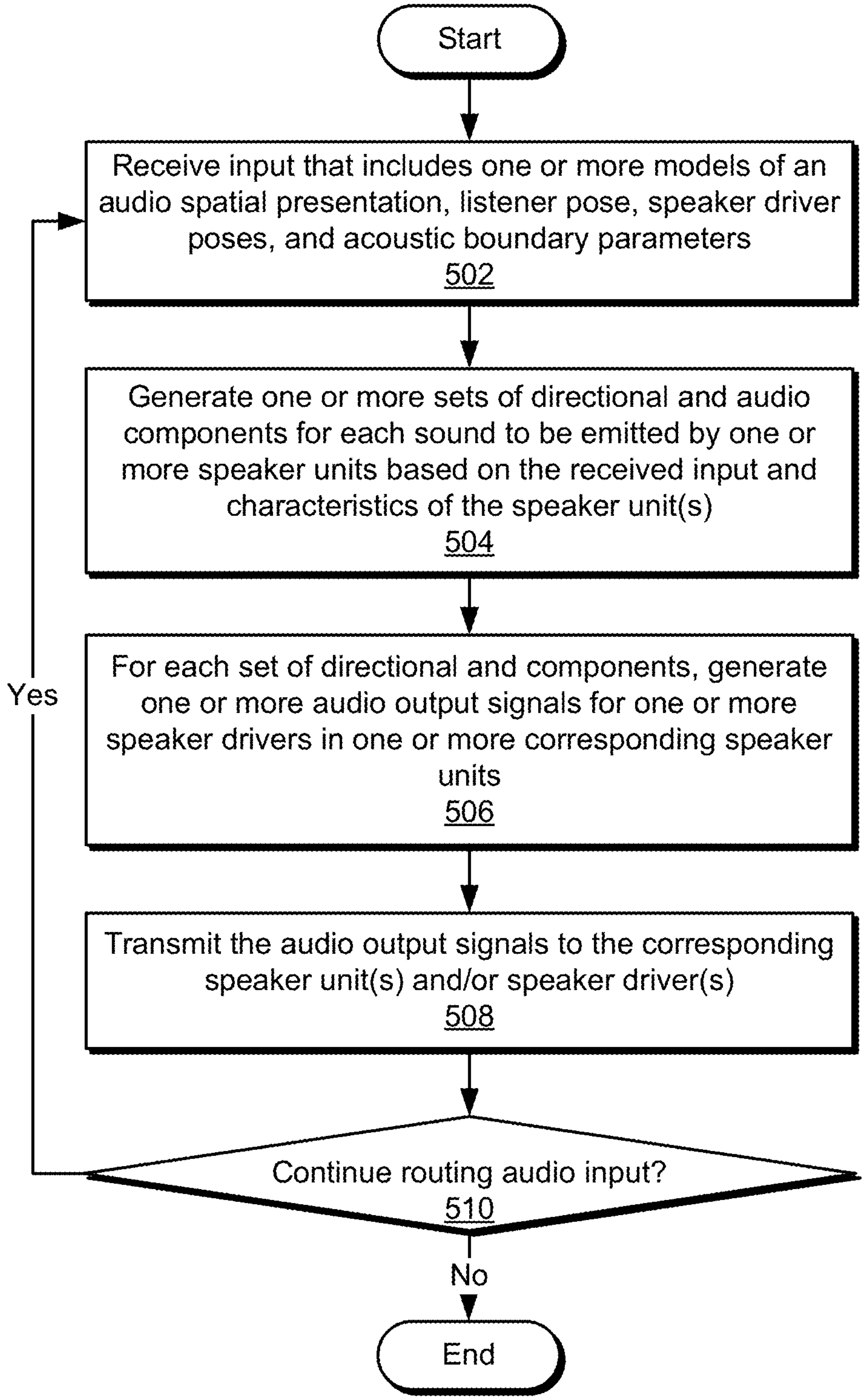
FIG. 5 is a flow diagram of method steps for routing audio input to one or more speaker units in a speaker system, according to various embodiments.

FIG. 5 is a flow diagram of method steps for routing audio input to one or more speaker units in a speaker system, according to various embodiments. Although the method steps are described in conjunction with the systems of FIGS. 1A-4, persons skilled in the art will understand that any system configured to perform the method steps, in any order, is within the scope of the present invention.

As shown, in step 502, system controller 102 receives input that includes of an audio spatial presentation, listener pose, one or more speaker driver poses, and acoustic boundary parameters. In some embodiments, the inputs correspond to the one or more models 108. For example, system controller 102 could receive, from an audio input source, an audio spatial presentation that includes coordinates, vectors, and/or other representations of the perceived locations or directions of one or more audio inputs. System controller 102 could use one or more sensors to determine a layout of an environment around the speaker system, which includes the listener pose, speaker driver poses, and/or acoustic boundary parameters. System controller 102 could also, or instead, receive the listener pose, speaker driver poses, and/or acoustic boundary parameters from a user.

Next, in step 504, system controller 102 generates one or more sets of directional and audio components for each sound to be emitted by one or more speaker units (e.g., speaker units with orthogonal speaker drivers, soundbars, and/or other arrangements of speaker drivers within speaker enclosures) based on the received input and characteristics of the speaker unit(s). For example, system controller 102 could apply frequency response optimization, differential left and right listener ear optimization, and/or other types of optimizations to each of the one or more audio input signals to generate audio input 302 corresponding to one or more audio components of the sound to be emitted by one or more speaker units. System controller 102 could also determine, for each speaker unit involved in emitting the sound, a maximum sound per zone (e.g., a 3D region of space in proximity to the speaker system), a maximum silence per zone, one or more beam and null directions 304, and/or another directional component related to the transmission of audio by the speaker system.

More specifically, system controller 102 can determine, for a given sound, a different set of directional and audio components for each speaker unit involved in generating the sound. System controller 102 also generates one or more sets of directional and audio components per sound, so that the combined audio emitted by the corresponding speaker unit(s) renders the sound from a perceived direction for a listener with a given position and orientation (i.e., listener pose received in step 502). System controller 102 then repeats this process for each sound to be emitted at a given time, so that a given speaker unit involved in emitting one or more sounds at that time is associated with one or more corresponding sets of directional and audio components generated in step 504. As described in further detail below, multiple sets of directional and audio components for multiple sounds can additionally be combined or superimposed at the speaker driver level to determine the audio outputted by individual speaker drivers in the speaker unit.

In step 506, system controller 102 and/or audio processing engine 104 generate, for each set of directional and audio components generated in step 504, one or more audio output signals for one or more speakers in a corresponding speaker unit. For example, system controller 102 and/or audio processing engine 104 could generate, for each respective set of directional and audio components, audio output signals that cause the corresponding speaker unit to render beams of sound and nulls based on each respective set of directional and audio components, as described in further detail below with respect to FIG. 6.

When system controller 102 and/or audio processing engine 104 determine that multiple sets of directional and audio components generated in step 504 are associated with a given speaker unit (i.e., the speaker unit is used to emit multiple concurrent sounds corresponding to the multiple sets of directional and audio components), system controller 102 and/or audio processing engine 104 can compute a separate audio output signal for each sound to be emitted by each speaker driver in the speaker unit. System controller 102 and/or audio processing engine 104 could then sum, superimpose, or otherwise combine the audio output signals for each speaker driver in the speaker unit into a single combined audio output signal for the speaker driver.

In step 508, system controller 102 and/or audio processing engine 104 transmit the audio output signals generated and/or combined in step 506 to the corresponding speaker unit(s) and/or speaker driver(s). The transmitted audio output signals cause the speaker unit(s) and/or speaker driver(s) to emit sounds corresponding to the audio output signals. Sounds emitted by multiple speaker drivers and/or speaker units can be used to render beams of sound and nulls corresponding to the directional and audio components determined in step 504.

In step 510, system controller 102 determines whether or not to continue routing audio input. For example, system controller 102 could continue routing audio input to the speaker unit(s) and/or speaker driver(s) while the speaker unit(s) are used to render sounds at various locations. If system controller 102 determines that routing of audio input is to continue, system controller 102 may repeat steps 502-508 for additional sounds to be emitted by the speaker unit(s). Once system controller 102 determines that routing of audio input is to be discontinued, system controller 102 discontinues processing related to the input.

Figure 6:
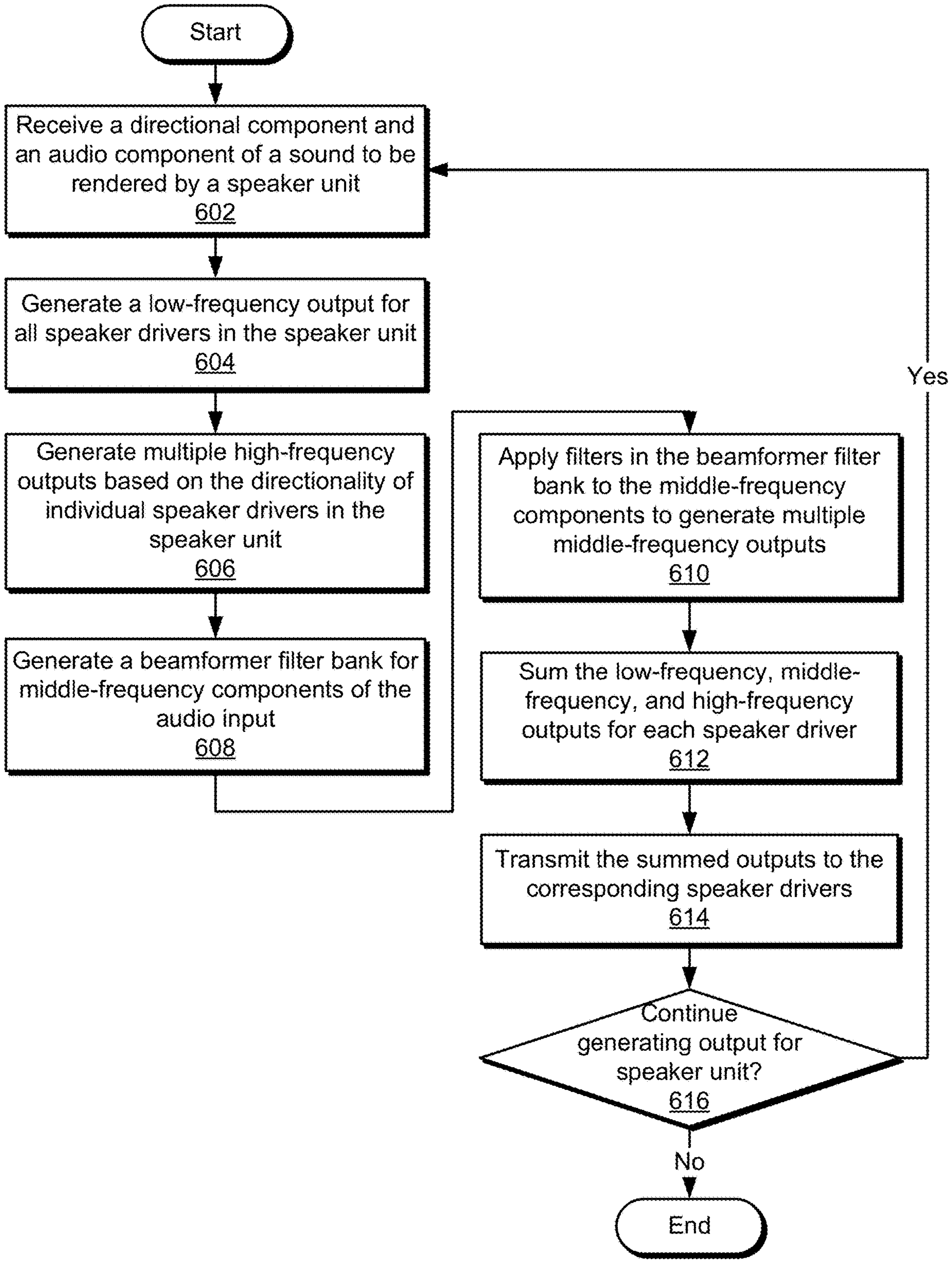
FIG. 6 is a flow diagram of method steps for generating audio output on a speaker unit, according to various embodiments.

FIG. 6 is a flow diagram of method steps for generating audio output on a speaker unit, according to various embodiments. Although the method steps are described in conjunction with the systems of FIGS. 1A-5, persons skilled in the art will understand that any system configured to perform the method steps, in any order, is within the scope of the present invention.

As shown, in step 602, audio processing engine 104 receives a directional component and an audio component of a sound to be rendered by a speaker unit. For example, audio processing engine 104 could receive the directional and audio components as a one-dimensional audio input 302 and one or more beam and null directions 304 associated with the audio input determined by system controller 102 during step 504 of FIG. 5.

Next, in step 604, audio processing engine 104 generates a low-frequency output 322 for all speaker drivers in the speaker unit. For example, audio processing engine 104 could include, in low-frequency output 322, all frequencies in the sound that fall below a first threshold.

In step 606, audio processing engine 104 generates multiple high-frequency outputs 310 based on the directionality of individual speaker drivers in the speaker units. For example, audio processing engine 104 could generate N high-frequency outputs 310 for N speaker drivers in speaker unit 106. Each high-frequency output could include frequencies in the sound that exceed a second threshold. The strength of each high-frequency output could be inversely proportional to the angle between the direction at which the corresponding speaker driver points and the direction of a beam of sound to be created from the audio input. In other words, non-zero high-frequency outputs 310 may be generated for speaker drivers that generally point in the direction of the beam, while zero-valued high-frequency outputs 310 may be generated for speaker drivers that do not point in the direction of the beam.

In step 608, audio processing engine 104 generates beamformer filter bank 314 for middle-frequency components of the audio input. The middle-frequency components may include frequencies in the sound that fall between the first and second thresholds, and beamformer filter bank 314 may include N bandpass filters for N speaker drivers in speaker unit 106 (or for N speaker drivers in a soundbar or another arrangement of speaker drivers within a speaker enclosure). In step 610, audio processing engine 104 applies filters in beamformer filter bank 314 to the middle-frequency components to generate multiple middle-frequency outputs 324. For example, audio processing engine 104 could combine the middle-frequency components with the bandpass filters to generate N middle-frequency outputs 324 for N speaker drivers in speaker unit 106. Middle-frequency outputs 324 could include different amplitudes, phases, and/or delays to allow the speaker drivers to transmit audio that forms one or more beams at the corresponding directions.

In step 612, audio processing engine 104 sums the low-frequency, middle-frequency, and high-frequency outputs 322, 324, and 310 for each speaker driver. For example, audio processing engine 104 could combine the low-frequency, middle-frequency, and high-frequency outputs into a single audio output for each speaker driver.

In step 614, audio processing engine 104 transmits the summed outputs to the corresponding speaker drivers. In turn, the speaker drivers generate audio corresponding to the summed outputs to render the sound at one or more locations.

In step 616, audio processing engine 104 determines whether or not to continue generating output for a given speaker unit. For example, audio processing engine 104 could continue generating output for the speaker unit for additional sounds to be transmitted by the speaker unit and/or additional input received from system controller 102. If audio processing engine 104 determines that generation of output for the speaker unit is to continue, audio processing engine 104 may repeat steps 602-616 for additional sounds to be emitted by the speaker unit. These sounds may be outputted concurrently by the speaker unit and/or at different times. Once audio processing engine 104 determines that generation of output to the speaker unit is to be discontinued (e.g., after playback of an audio track or file is complete), audio processing engine 104 discontinues processing related to output.

In one or more embodiments, steps 602-616 are performed separately by one or more instances of audio processing engine 104. These instances of audio processing engine 104 can execute on one or more speaker units 106, soundbars, and/or other arrangements of speaker drivers within speaker enclosures. One or more instances of audio processing engine 104 can also, or instead, execute on one or more devices (e.g., amplifiers, receivers, computer systems, etc.) that are separate from and coupled to multiple speaker units and used to generate audio output for the speaker units. Audio output from the instance(s) of audio processing engine 104 can then be used by the speaker units to generate beams of audio and/or nulls, which arrive at a listener at a given position and orientation so that the listener hears sounds that appear to originate from various locations around the listener.

In addition, a given instance of audio processing engine 104 can perform steps 602-616 multiple times to process multiple concurrent directional and audio components of sounds received from system controller 102 and cause a speaker unit to emit multiple sounds with those directional and audio components. More specifically, audio processing engine 104 can concurrently and/or sequentially execute steps 602-610 multiple times to generate multiple sets of low-frequency, middle-frequency, and high-frequency outputs from multiple sets of audio and directional components determined by system controller 102 in step 504 of FIG. 5. Audio processing engine 104 can also concurrently execute steps 612-614 multiple times to combine the multiple sets of frequency, middle-frequency, and high-frequency outputs corresponding to multiple directional and audio components and transmit the combined outputs to the corresponding speaker drivers in the speaker unit. These combined outputs can cause the speaker unit to emit multiple concurrent sounds corresponding to multiple directional and audio components determined by system controller 102.

In sum, the disclosed techniques support the rendering of sounds in arbitrary directions within a 3D sound field. A system controller receives an audio input signal, one or more locations at which sounds associated with the audio input signal are to be rendered, a first geometric model of a speaker system, and a second geometric model of one or more surfaces in proximity to the speaker system. The system controller performs spatial optimization that generates a directional component and an audio component of a sound to be rendered by each speaker in the speaker system. The system controller transmits the directional component and audio component to an audio processing engine. The audio processing engine uses the directional and audio components from the system controller to generate, for each sound, a single low-frequency output for all speaker drivers in the speaker, multiple high-frequency outputs based on the directionality of the speaker drivers and the direction of a beam of the sound, and multiple middle-frequency outputs that are used to form the beam. The low-frequency, middle-frequency and high-frequency outputs for each speaker driver are summed and transmitted to the speaker driver to cause the speaker driver to transmit audio that includes low-frequency, middle-frequency, and/or high-frequency components. Each speaker driver can additionally superimpose multiple outputs corresponding to multiple sounds from the audio processing engine to contribute to the transmission of the multiple sounds. Sounds transmitted by multiple speaker drivers and/or multiple speakers can then be used to generate beams and/or nulls in various directions. These beams and/or nulls can additionally be combined to render the sounds at various perceived locations for a listener at a given listener location.

The speaker system includes one or more speaker units that can transmit sound in multiple directions. For example, each speaker unit could include six speaker drivers that are substantially orthogonal to one another and on different faces of a cuboid speaker enclosure. The six speaker drivers could point up, down, left, right, forwards, and backwards. Sounds emitted by the speaker drivers could thus reach a listener via one or more direct paths and/or indirect paths. Amplitudes, phases, delays, and/or other attributes of the sounds could additionally be varied to form beams of sound that arrive at the listener from various directions.

One technical advantage of the disclosed techniques relative to the prior art is that, with the disclosed techniques, sound can be generated that appears to originate from arbitrary locations within a full 3D sound field using fewer speaker units. Accordingly, the disclosed techniques increase the spatial coverage and resolution of sound transmitted within the sound field without requiring the placement of additional speaker units at locations from which the sound appears to originate. Another technical advantage of the disclosed techniques is the ability to generate sound in a way that accounts for the environment around the speaker units and the position and orientation of a listener within the environment. The disclosed techniques thus reduce distortion, loss of audio quality, and/or loss of spatial resolution associated with the blocking of sound by objects, interference between sounds produced by different speakers, and/or changes in the listener's position or orientation. These technical advantages provide one or more technological improvements over prior art approaches.

1. In some embodiments, a computer-implemented method for generating audio for a speaker system comprises receiving an audio input signal, a first location associated with the audio input signal, a first geometric model of the speaker system, and a second geometric model of one or more surfaces in proximity to the speaker system, generating a plurality of output signals for a plurality of speaker drivers in the speaker system based on the audio input signal, the first location, the first geometric model, and the second geometric model, and transmitting the plurality of output signals to the plurality of speaker drivers, wherein the plurality of speaker drivers emit audio that corresponds to the plurality of output signals, the emitted audio rendering a sound corresponding to the audio input signal at the first location.
2. The computer-implemented method of clause 1, wherein generating the plurality of output signals comprises generating a low-frequency output that is transmitted to the plurality of speaker drivers, generating one or more high-frequency outputs based on the first location and a plurality of directions at which the plurality of speaker drivers emit the audio, and generating one or more middle-frequency outputs that are used to form one or more beam patterns for rendering the sound at the first location.
3. The computer-implemented method of clauses 1 or 2, further comprising generating the plurality of output signals based on a second location associated with a perceived lack of sound.
4. The computer-implemented method of any of clauses 1-3, wherein the emitted audio comprises at least one of a first sound component that is emitted directly from a first speaker driver to a listener or a second sound component from a second speaker driver that is reflected off a surface before reaching the listener.
5. The computer-implemented method of any of clauses 1-4, wherein the first sound component and the second sound component are generated to concurrently arrive at the listener.
6. The computer-implemented method of any of clauses 1-5, wherein the first geometric model comprises a position and an orientation associated with the plurality of speaker drivers.
7. The computer-implemented method of any of clauses 1-6, wherein the second geometric model further comprises a position and an orientation associated with a listener.
8. The computer-implemented method of any of clauses 1-7, wherein receiving the second geometric model comprises performing one or more acoustic measurements at a second location that is in proximity to the speaker system.
9. The computer-implemented method of any of clauses 1-8, wherein the one or more surfaces comprise at least one of a wall, a floor, a ceiling, a corner, or an object.
10. The computer-implemented method of any of clauses 1-9, wherein the plurality of speaker drivers comprise a first speaker driver that emits sound in a first direction, a second speaker driver that emits sound in a second direction that is substantially opposite the first direction, a third speaker driver that emits sound in a third direction that is substantially orthogonal to the first direction and the second direction, and a fourth speaker driver that emits sound in a fourth direction that is substantially opposite the third direction and substantially orthogonal to the first direction and the second direction.
11. In some embodiments, one or more non-transitory computer readable media store instructions that, when executed by one or more processors, cause the one or more processors to perform the steps of receiving a first audio input signal, a first location associated with the first audio input signal, a first geometric model of a speaker system, and a second geometric model of one or more surfaces in proximity to the speaker system, generating a first plurality of output signals for a plurality of speaker drivers in the speaker system based on the first audio input signal, the first location, the first geometric model, and the second geometric model, and transmitting the first plurality of output signals to the plurality of speaker drivers, wherein the plurality of speaker drivers emit audio that corresponds to the first plurality of output signals, the emitted audio rendering a first sound corresponding to the first audio input signal at the first location.
12. The one or more non-transitory computer readable media of clause 11, wherein the instructions further cause the one or more processors to perform the step of adjusting the first audio input signal based on one or more characteristics associated with the plurality of speaker drivers.
13. The one or more non-transitory computer readable media of clauses 11 or 12, wherein generating the first plurality of output signals comprises generating a low-frequency output that is transmitted to the plurality of speaker drivers, generating one or more high-frequency outputs based on the first location and a plurality of directions at which the plurality of speaker drivers emit the audio, and generating one or more middle-frequency outputs that are used to form one or more beam patterns for rendering the sound at the first location.
14. The one or more non-transitory computer readable media of any of clauses 11-13, wherein the second geometric model comprises an acoustic boundary associated with the one or more surfaces, an absorption parameter associated with the one or more surfaces, and a reflection parameter associated with the one or more surfaces.

15. The one or more non-transitory computer readable media of any of clauses 11-14, wherein the emitted audio comprises at least one of a first sound component that is emitted directly from a first speaker driver to a listener or a second component from a second speaker driver that is reflected off a surface before reaching the listener.

16. The one or more non-transitory computer readable media of any of clauses 11-15, wherein the instructions further cause the one or more processors to perform the steps of generating a second plurality of output signals based on a second audio input signal, a second location associated with the second audio input signal, the first geometric model, and the second geometric model, combining the second plurality of output signals with the first plurality of output signals to generate a respective combined output signal for each of the plurality of speaker drivers, and transmitting the combined plurality of output signals to the plurality of speaker drivers, wherein the plurality of speaker drivers emit audio that corresponds to the emitted audio rendering the first sound corresponding to the first audio input signal at the first location and a second sound corresponding to the second audio input signal at the second location.

17. The one or more non-transitory computer readable media of any of clauses 11-16, wherein receiving the first geometric model and the second geometric model comprises generating at least one of the first geometric model or the second geometric model based on user input that describes an environment around the speaker system.

18. In some embodiments, a speaker system comprises a first plurality of speaker drivers housed within a first speaker enclosure, a memory that stores instructions, and a processor that is coupled to the memory and, when executing the instructions, is configured to receive an audio input signal, a first location associated with the audio input signal, a first geometric model of the speaker system, and a second geometric model of one or more surfaces in proximity to the speaker system, generate a first plurality of output signals for the first plurality of speaker drivers based on the audio input signal, the first location, the first geometric model, and the second geometric model, and transmit the first plurality of output signals to the first plurality of speaker drivers, wherein the first plurality of speaker drivers emit audio that corresponds to the first plurality of output signals, the emitted audio rendering a sound corresponding to the audio input signal at the first location.

19. The speaker system of clause 18, wherein the first plurality of speaker drivers comprises a first speaker driver that emits sound in a first direction, a second speaker driver that emits sound in a second direction that is substantially opposite the first direction, a third speaker driver that emits sound in a third direction that is substantially orthogonal to the first direction and the second direction, a fourth speaker driver that emits sound in a fourth direction that is substantially opposite the third direction and substantially orthogonal to the first direction and the second direction, a fifth speaker driver that emits sound in a fifth direction that is substantially orthogonal to the first direction, the second direction, the third direction, and the fourth direction, and a sixth speaker driver that emits sound in a sixth direction that is substantially opposite the fifth direction and substantially orthogonal to the first direction, the second direction, the third direction, and the fourth direction.

20. The speaker system of clauses 18 or 19, further comprising a second plurality of speaker drivers housed within a second speaker enclosure, and wherein the processor, when executing the instructions, is further configured to generate a second plurality of output signals for the second plurality of speaker drivers based on the audio input signal, a second location associated with the audio input signal, the first geometric model, and the second geometric model, and transmit the second plurality of output signals to the second plurality of speaker drivers, wherein the second plurality of speaker drivers emit audio that corresponds to the second plurality of output signals, the emitted audio rendering the sound at the second location.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating audio for a speaker system that includes a speaker comprising a plurality of speaker drivers, the method comprising:

receiving an audio input signal, a first location associated with the audio input signal, a first geometric model of the speaker system that includes a location of each speaker driver included in the plurality of speaker drivers of the speaker, a second geometric model of one or more surfaces in proximity to the plurality of speaker drivers, and a second location associated with a listening position that is different than the location of each speaker driver included in the plurality of speaker drivers of the speaker;

generating a plurality of output signals for the plurality of speaker drivers of the speaker based on the audio input signal, the first location, the second location, the first geometric model, and the second geometric model; and transmitting the plurality of output signals to the plurality of speaker drivers of the speaker, wherein the plurality of speaker drivers emit audio that corresponds to the plurality of output signals, the emitted audio rendering a sound that corresponds to the audio input signal at the first location.

2. The computer-implemented method of claim 1, wherein generating the plurality of output signals comprises:

generating a low-frequency output that is transmitted to the plurality of speaker drivers;

generating one or more high-frequency outputs based on the first location and a plurality of directions at which the plurality of speaker drivers emit the audio; and generating one or more middle-frequency outputs that are used to form one or more beam patterns for rendering the sound at the first location.

3. The computer-implemented method of claim 1, further comprising generating the plurality of output signals based on a third location associated with a perceived lack of sound.

4. The computer-implemented method of claim 1, wherein the emitted audio comprises at least one of a first sound component that is emitted directly from a first speaker driver to a listener or a second sound component from a second speaker driver that is reflected off a surface before reaching the listener.

5. The computer-implemented method of claim 4, wherein the first sound component and the second sound component are generated to concurrently arrive at the listener.

6. The computer-implemented method of claim 1, wherein the first geometric model further comprises an orientation associated with the plurality of speaker drivers.

7. The computer-implemented method of claim 1, wherein receiving the second geometric model comprises performing one or more acoustic measurements at a third location that is in proximity to the speaker system.

8. The computer-implemented method of claim 1, wherein the one or more surfaces comprise at least one of a wall, a floor, a ceiling, a corner, or an object.

9. The computer-implemented method of claim 1, wherein the plurality of speaker drivers comprise a first speaker driver that emits sound in a first direction, a second speaker driver that emits sound in a second direction that is substantially opposite the first direction, a third speaker driver that emits sound in a third direction that is substantially orthogonal to the first direction and the second direction, and a fourth speaker driver that emits sound in a fourth direction that is substantially opposite the third direction and substantially orthogonal to the first direction and the second direction.

10. One or more non-transitory computer readable media storing instructions that, when executed by one or more processors, cause the one or more processors to perform the steps of:

receiving an audio input signal, a first location associated with the audio input signal, a first geometric model of a speaker system that includes a location of each speaker driver included in a plurality of speaker drivers of a speaker, a second geometric model of one or more surfaces in proximity to the plurality of speaker drivers, and a second location associated with a listening position that is different than the location of each speaker driver included in the plurality of speaker drivers of the speaker;

generating a first plurality of output signals for the plurality of speaker drivers of the speaker based on the audio input signal, the first location, the second location, the first geometric model, and the second geometric model; and transmitting the first plurality of output signals to the plurality of speaker drivers of the speaker, wherein the plurality of speaker drivers emit audio that corresponds to the first plurality of output signals, the emitted audio rendering a sound corresponding to the audio input signal at the first location.

11. The one or more non-transitory computer readable media of claim 10, wherein the instructions further cause the one or more processors to perform the step of adjusting the audio input signal based on one or more characteristics associated with the plurality of speaker drivers.

12. The one or more non-transitory computer readable media of claim 10, wherein generating the first plurality of output signals comprises:

generating a low-frequency output that is transmitted to the plurality of speaker drivers;

generating one or more high-frequency outputs based on the first location and a plurality of directions at which the plurality of speaker drivers emit the audio; and generating one or more middle-frequency outputs that are used to form one or more beam patterns for rendering the sound corresponding to the audio input signal at the first location.

13. The one or more non-transitory computer readable media of claim 10, wherein the second geometric model comprises an acoustic boundary associated with the one or more surfaces, an absorption parameter associated with the one or more surfaces, and a reflection parameter associated with the one or more surfaces.

14. The one or more non-transitory computer readable media of claim 10, wherein the emitted audio comprises at least one of a first sound component that is emitted directly from a first speaker driver to a listener or a second component from a second speaker driver that is reflected off a surface before reaching the listener.

15. The one or more non-transitory computer readable media of claim 10, wherein the instructions further cause the one or more processors to perform the steps of:

generating a second plurality of output signals based on a second audio input signal, a third location associated with the second audio input signal, the first geometric model, and the second geometric model;

combining the second plurality of output signals with the first plurality of output signals to generate a respective combined output signal for each of the plurality of speaker drivers; and transmitting the combined plurality of output signals to the plurality of speaker drivers, wherein the plurality of speaker drivers emit audio that corresponds to the emitted audio rendering the sound corresponding to the audio input signal at the first location and a second sound corresponding to the second audio input signal at the third location.

16. The one or more non-transitory computer readable media of claim 10, wherein receiving the first geometric model and the second geometric model comprises generating at least one of the first geometric model or the second geometric model based on user input that describes an environment around the speaker system.

17. A speaker system, comprising:

a first speaker comprising a first plurality of speaker drivers;

a memory that stores instructions; and a processor that is coupled to the memory and, when executing the instructions, is configured to:

receive an audio input signal, a first location associated with the audio input signal, a first geometric model of the speaker system that includes a location each speaker driver included in the first plurality of speaker drivers of the first speaker, a second geometric model of one or more surfaces in proximity to the speaker system, and a second location associated with a listening position that is different than the location of each speaker driver included in the first plurality of speaker drivers of the first speaker, generate a first plurality of output signals for the first plurality of speaker drivers of the first speaker based on the audio input signal, the first location, the second location, the first geometric model, and the second geometric model; and transmit the first plurality of output signals to the first plurality of speaker drivers of the first speaker, wherein the first plurality of speaker drivers emit audio that corresponds to the first plurality of output signals, the emitted audio rendering a sound corresponding to the audio input signal at the first location.

18. The speaker system of claim 17, wherein the first plurality of speaker drivers comprises:

a first speaker driver that emits sound in a first direction;

a second speaker driver that emits sound in a second direction that is substantially opposite the first direction;

a third speaker driver that emits sound in a third direction that is substantially orthogonal to the first direction and the second direction;

a fourth speaker driver that emits sound in a fourth direction that is substantially opposite the third direction and substantially orthogonal to the first direction and the second direction;

a fifth speaker driver that emits sound in a fifth direction that is substantially orthogonal to the first direction, the second direction, the third direction, and the fourth direction; and a sixth speaker driver that emits sound in a sixth direction that is substantially opposite the fifth direction and substantially orthogonal to the first direction, the second direction, the third direction, and the fourth direction.

19. The speaker system of claim 17, further comprising a second speaker comprising a second plurality of speaker drivers, and wherein the processor, when executing the instructions, is further configured to:

generate a second plurality of output signals for the second plurality of speaker drivers based on the audio input signal, a third location associated with the audio input signal, the first geometric model, and the second geometric model; and transmit the second plurality of output signals to the second plurality of speaker drivers, wherein the second plurality of speaker drivers emit audio that corresponds to the second plurality of output signals, the emitted audio rendering the sound at the third location.

* * * * *